United States Patent
Abrishami et al.

(10) Patent No.: US 7,167,469 B2
(45) Date of Patent: Jan. 23, 2007

(54) METHOD FOR ELIMINATING MULTIPLE MODULATION AND DEMODULATION OF VOICE BAND DATA COMMUNICATION OVER PACKET AND LOW DATA RATE DIGITAL NETWORKS

(75) Inventors: Mehrdad Abrishami, Gaithersburg, MD (US); Jianwei Bei, Rockville, MD (US)

(73) Assignee: LSI Logic Corporation, Milpitas, CA (US)

( * ) Notice: Subject to any disclaimer, the term of this patent is extended or adjusted under 35 U.S.C. 154(b) by 999 days.

(21) Appl. No.: 10/080,219

(22) Filed: Feb. 21, 2002

(65) Prior Publication Data
US 2002/0118673 A1    Aug. 29, 2002

Related U.S. Application Data

(63) Continuation-in-part of application No. 09/779,750, filed on Feb. 9, 2001.

(51) Int. Cl.
*H04L 12/66* (2006.01)
(52) U.S. Cl. ........................ 370/352; 370/401; 370/465
(58) Field of Classification Search ........ 370/236–244, 370/285–287, 271, 290, 493, 352, 401, 465, 370/466, 431
See application file for complete search history.

(56) References Cited

U.S. PATENT DOCUMENTS

| | | | | |
|---|---|---|---|---|
| 5,732,104 A | * | 3/1998 | Brown et al. | 375/222 |
| 5,867,487 A | * | 2/1999 | Normand et al. | 370/296 |
| 5,963,622 A | * | 10/1999 | Walsh | 379/93.33 |
| 6,088,129 A | * | 7/2000 | Yoshida | 358/439 |
| 6,236,469 B1 | * | 5/2001 | Watanabe et al. | 358/468 |
| 6,437,870 B1 | * | 8/2002 | Yoshida et al. | 358/1.15 |
| 6,765,931 B1 | * | 7/2004 | Rabenko et al. | 370/493 |
| 6,819,750 B1 | * | 11/2004 | Mehta et al. | 379/100.17 |
| 6,882,711 B1 | * | 4/2005 | Nicol | 379/93.33 |
| 6,950,425 B1 | * | 9/2005 | Takahashi | 370/352 |
| 6,990,195 B1 | * | 1/2006 | LeBlanc et al. | 379/406.08 |
| 6,996,094 B1 | * | 2/2006 | Cave et al. | 370/356 |

* cited by examiner

*Primary Examiner*—Chau Nguyen
*Assistant Examiner*—Andrew C. Lee
(74) *Attorney, Agent, or Firm*—Trexler, Bushnell, Giangiorgi, Blackstone & Marr Ltd.

(57) ABSTRACT

A method of processing Voice band Data in a communication path in a telecommunication network. The communication path consists of a plurality of Voice band Data relay gateways, including a first Voice band Data relay gateway, a last Voice band Data relay gateway, and at least one Voice band Data relay gateway between the first and last Voice band Data relay gateways. The method includes steps of detecting the Voice band Data relay gateway, and disabling the at least one Voice band Data relay gateway between the first and last Voice band Data relay gateways, whereby the at least one Voice band Data relay gateway between the first and last Voice band Data relay gateways does not encode and decode the Voice band Data.

20 Claims, 2 Drawing Sheets

METHOD FOR ELIMINATING MULTIPLE MODULATION AND DEMODULATION OF VOICE BAND DATA COMMUNICATION OVER PACKET AND LOW DATA RATE DIGITAL NETWORKS

RELATED APPLICATION

This application is a continuation-in-part of U.S. patent application Ser. No. 09/779,750, filed Feb. 9, 2001.

BACKGROUND

The present invention generally relates to methods of communicating Voice band Data over packet and low data rate digital networks, and more specifically relates to a method for detection and bypass of encoding/decoding of Voice band Data, in a telecommunication network consisting of more than one pair, or "tandem" of Voice band Data relay gateways, in order to reduce the end-to-end processing delay of the Voice band Data signal, therefore increasing the performance of the Voice band Data relay. In short, the present invention relates to a method in detection and avoidance of Voice band Data relay connection.

Most protocols have built-in timing requirements that cause the transmission to be terminated (or retried) if the time delay exceeds certain predefined threshold values. One protocol which presently exists is the V.42 LAPM protocol, and the timing requirement is referred to as ITU-T V.42, T400, wherein T400 is the detection phase timer, which governs the amount of the time that a control function in an originating or answering DCE waits for the ADP (answer detection pattern) or the ODP (originator detection pattern), respectively. The default value for the timer T400 is 750 ms. This is the estimated maximum propagation delay of all required transmissions at the data rate used in any V-Series modem that uses asynchronous-to-synchronous conversion.

Voice band Data Relay is used to allow Voice band Data transmission between Voice band Data terminals where, in addition to the PSTN or ISDN, a portion of the transmission path utilizes Low Rate Digital Networks or a packet network. Voice band Data relay is a technique by which a calling Voice band Data terminal supporting traditional V Series modem procedure is connected to a gateway through a Low Rate Digital Network or a packet network to another gateway which makes a PSTN call to the called Voice band Data equipment. Once the PSTN calls are established on both ends, the two Voice band Data terminals are virtually linked.

An end-to-end circuit connecting Voice band Data terminals may consist of multiple pairs of Voice band Data relay gateways. Each gateway adds delays to the overall processing of the signaling between two Voice band Data terminals in real-time. Therefore, when a network consists of two or three pairs or tandems of Voice band Data relays, the delay associated with demodulation/re-modulation of the Voice band Data signal and the associated protocol can result in Voice band Data transmission failure, due to the expiration of the timer at the originating or the answering side.

OBJECTS AND SUMMARY

A general object of an embodiment of the present invention is to detect and avoid Modulation/Demodulation and related processing associated with Voice band Data relay connections.

Another object of an embodiment of the present invention is to reduce the end-to-end processing delay of a Voice band Data signal, therefore increasing the performance of the Voice band Data relay.

Still another object of an embodiment of the present invention is to provide Voice band Data Tandem Tunneling as a bypass mechanism, where the in-between Voice band Data relay gateway process is disabled for the period of a Voice band Data call.

Briefly, and in accordance with at least one of the forgoing objects, an embodiment of the present invention provides a method of processing Voice band Data in a communication path in a telecommunication network, said communication path consisting of a plurality of Voice band Data relay gateways, including a first Voice band Data relay gateway, a last Voice band Data relay gateway, and at least one Voice band Data relay gateway between the first and last Voice band Data relay gateways. The method includes steps of detecting the at least one Voice band Data relay gateway between the first and last Voice band relay gateways, and disabling the at least one Voice band Data relay gateway between the first and last Voice band Data relay gateways, whereby the at least one Voice band Data relay gateway between the first and last Voice band Data relay gateways does not encode and decode the Voice band Data.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DESCRIPTION

Figure 1:
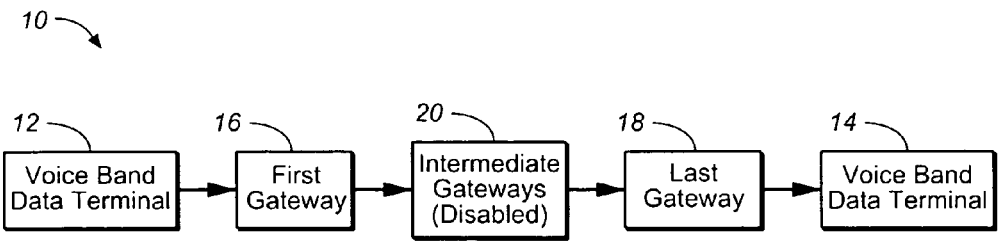
FIG. 1 is a schematic diagram which illustrates an end-to-end circuit (i.e., a telecommunication network) connecting Voice band Data terminals, where the end-to-end circuit includes multiple pairs of Voice band Data relay gateways, and a method in accordance with an embodiment of the present invention is employed to reduce delays.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

FIG. 1 provides a schematic diagram which illustrates an end-to-end circuit (i.e., a telecommunication network) 10 wherein one Voice band Data terminal (the Calling terminal) 12 is communicating with another Voice band Data terminal (the Answerer terminal) 14, and the communication path between the Voice band Data terminals 12 and 14 includes multiple pairs (i.e., "tandems") of Voice band Data relay gateways, including a first gateway 16, a last gateway 18, and gateways 20 there between. Normally, each of the pairs of Voice band Data relay gateways 16, 18, 20 would demodulate/modulate the Voice band Data, thereby adding delay which may result in transmission error. Instead, as shown in FIG. 1, an embodiment of the present invention provides that the Voice band Data relay gateways 20 between the first (16) and last (18) Voice band Relay gateways are detected, and the Voice band Data relay gateways between the first and last Voice band Data relay gateways 20 are effectively disabled, whereby they do not encode and decode the Voice band Data and introduce unnecessary delay to the transmission.

By detecting and disabling modulation/demodulation and associated processing within a Voice band Data relay Gateway, the processing delay associated with the Voice band Data relay gateways are removed, therefore improving the performance of the Voice band Data transmission. The detection and removal of Voice band Data tandem reduces the end-to-end processing delay of the Voice band Data signal, therefore increasing the performance of the Voice band Data relay. The removal of Voice band Data tandems or "Voice band Data Tandem Tunneling", reduces the end-to-end delay.

Hence, an embodiment of the present invention provides Voice band Data Tandem Tunneling which effectively operates as a bypass mechanism, whereby the in-between Voice band Data relay gateway process is disabled for the period of the Voice band Data call, and only the gateway system closest to the end users is enabled. In reality, a tandem network could typically use 2 to 3 levels of cascading. While in operation, a unique signaling scheme between the DSP gateways that use the Voice band Data relay protocol over synchronous TDM or packet based network, enables and disables the Tandem Tunneling.

The present invention is a method of avoiding Voice band Data Relay tandem operation, and effectively consists of two parts:

I) A method to detect or probe the presence of the Voice band Data relay; and

II) A method to route the demodulated data over the PCM or Packet network.

Figure 2:
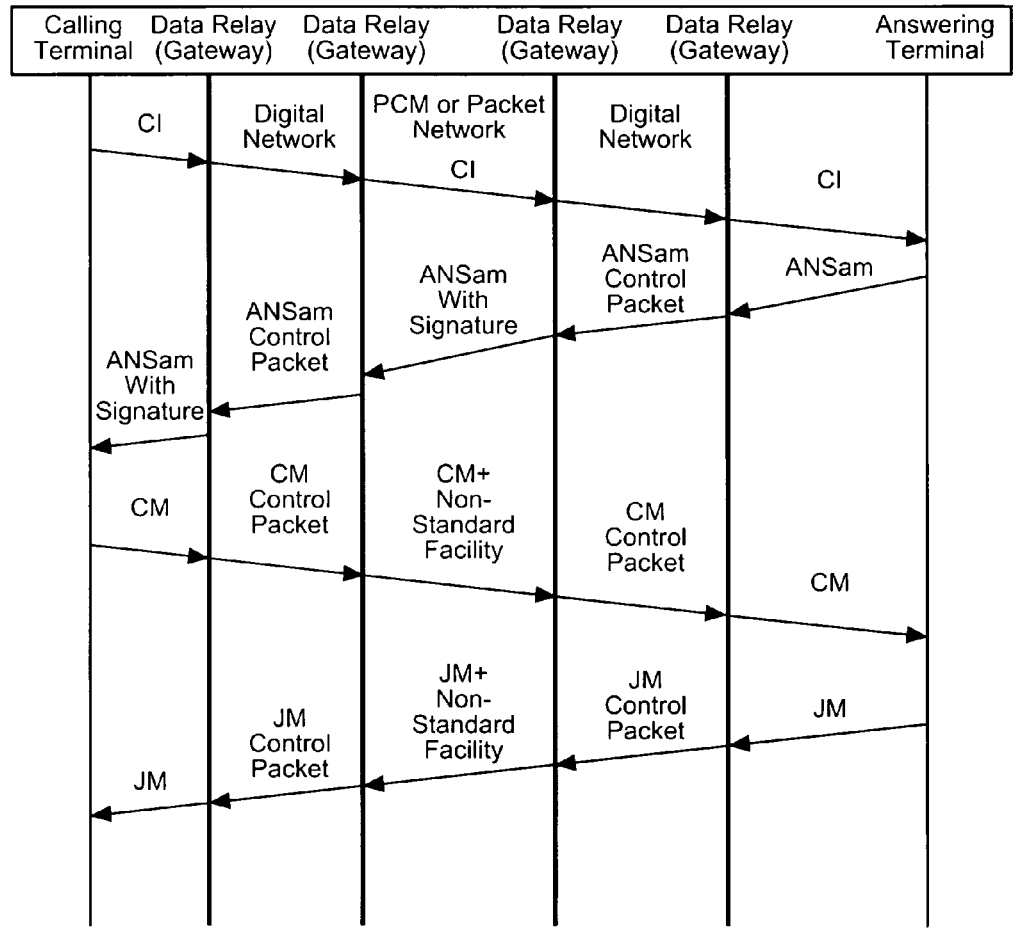
FIG. 2 is a schematic diagram which illustrates probing in accordance with the present invention when both Caller and Answerer support V.8 answer sequence.

Probing:

When calling Voice band Data terminal is connected to a called Voice band Data terminal, the establishment of the end-to-end connection can be initiated via the V.8 or the V.25 answering sequence. The following several scenarios may exist:

1) The Calling terminal and the Answerer terminal support V.8 sequence. The probing sequence to detect the presence of a Voice band Data relay gateway, is initiated by the Calling terminal, via the Non-standard facilities of the V.8 protocol. The V.8 protocol includes an optional non-standard information field following the standard fields in each CM (Call Menu signal) and JM (Joint Menu Signal) sequence to define information beyond what is defined in the V.8 recommendation. The gateway receiving the CM signal containing the non-standard facility, information ten transmits the JM signal with the non-standard facility indicating its presence and its capabilities. FIG. 2 illustrates this scenario; as well as the Call Indicator signal ("CI").

Figure 3:
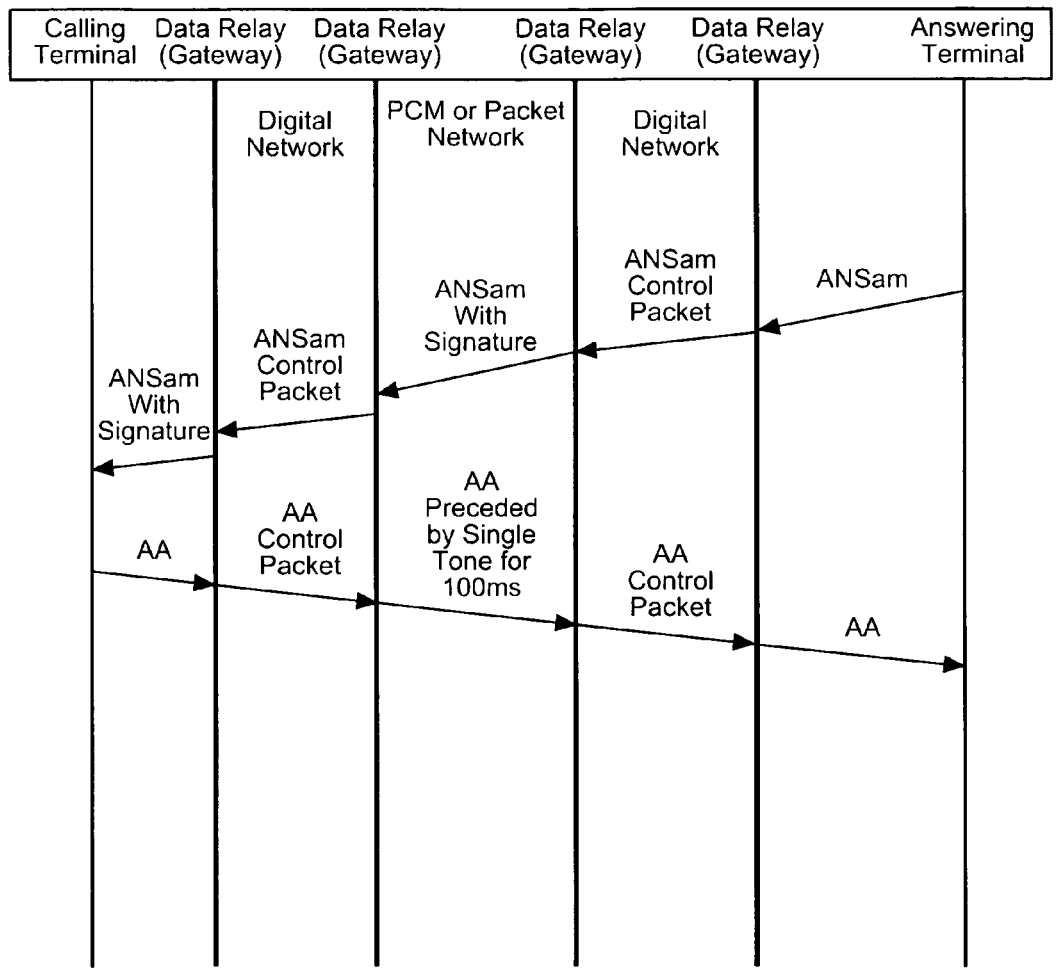
FIG. 3 is a schematic diagram which illustrates probing in accordance with the present invention when the Caller terminal does not support V.8 answer sequence.

2) The Calling terminal does not support V.8 calling sequence (for example a V.32bis modem terminal). The Answerer terminal may or may not support V.8 sequence. In this case, the Answer tone 2100 Hz with phase (defined in V.25) reversal or the ANSam tone (defined in V.8 and V.25) are modulated with a signature pattern at a set frequency. This modulation will be selected to be minimally intrusive to the network echo cancellers, which use the answering tone as a means to get disabled, when the tone is detected in either direction by these devices. The gateway detecting the modulated answer tone is actively muting the signals from the calling terminal toward the answering terminal. Upon the detection of the calling tone (such as AA from a V.32bis calling terminal), the gateway sends a reply tone to the gateway transmitting the modulated 2100 Hz tone. The reply signal may be a single tone at a set frequency for a pre-determined time internal not to exceed 100 ms. Alternatively, the reply signal can be transmiitted via a second frequency that is added to the AA signal (1800 Hz tone), This second frequency will have a lower amplitude than the 1800 Hz tone. FIG. 3 illustrates probing when calling does not support V.8.

Routing:

Modem Rate Adjustment:

Upon the successful training of the modems at the gateway ends closest to the user data terminals, the final negotiated rates are communicated between the gateways. Optionally, the gateways may employ methods to achieve a common link rate during the modem training. In the event that the final link rate is not the same between the two end points, the end point with the higher rate is forced to retrain at a lower rate. This procedure may be repeated to achieve a common link rate.

Data Rate Adjustment from User Date to Network Link Rate:

For a PCM network, the link rate is 64 Kbps. Therefore, the user data may have to be padded to allow the transmission of slower user data into the higher speed link rate. For packet network, this data rate to link rate adjustment may not be needed.

User Data Scrambling:

The method in accordance with an embodiment of the present invention may provide that after the user data is padded, it is scrambled in one direction and descrambled in the opposite direction, in order to insure that the network echo cancellers remain disabled.

Link Commands Between Inner Gateways:

In order to facilitate the mechanism to retrain during normal call, as well as providing a method for either gateway to terminate the call, a fixed non-scrambled pattern can be transmitted followed by a fixed length message containing the appropriate command.

A method in accordance with the present invention can be used in the following applications, as well as others: Voice over IP applications; Compressed networks over E1/T1; Satellite communications-VSATs; Voice over cable modems; and Other packet-based networks.

A method in accordance with the present invention provides that less resources are consumed (i.e., memory and computing resource requirements), that delay is removed, and that end-to-end connectivity is improved since there is less modulation and demodulation (modulation and demodulation can result in bit errors). Additionally, if the PCM segment of the network has bit error or frame slip or packet loss (if it is a packet network supporting 64 k PCM), then the modems associated with the middle gateways do not have to retrain, and higher level protocols will handle the user data retransmission without modem retraining.

While an embodiment of the present invention is shown and described, it is envisioned that those skilled in the art may devise various modifications of the present invention without departing from the spirit and scope of the appended claims.

What is claimed is:

1. A method of processing Voice band Data in a communication path in a telecommunication network, said communication path consisting of a plurality of Voice band Data relay gateways, each being capable of encoding and decoding Voice band Data, including a first Voice band Data relay gateway, a last Voice band Data relay gateway, and at least one voice band Data relay gateway between the first and last Voice band Data relay gateways, said method comprising:

detecting the at least one Voice band Data relay gateway between the first and last Voice band Data relay gateways; disabling the encoding and decoding capability of the at least one Voice band Data relay gateway between the first and last Voice band Data relay gateways, whereby the at least one Voice band Data relay gateway between the first and last Voice band Data relay gateways does not encode and decode the Voice band Data; despite being capable of doing so if not disabled, wherein only the first and last Voice band Data relay gateways are enabled and perform encoding and decoding of the Voice band Data; and after detecting and disabling the encoding and decoding capability of the at least one Voice band Data relay gateway between the first and last Voice band Data relay gateways, transmitting the Voice band Data from the first to the last Voice band Data relay gateway.

2. A method as recited in claim 1, further comprising using said first and last Voice band Data relay gateways to encode and decode the Voice band Data.

3. A method as recited in claim 1, further comprising disabling all of the Voice band Data relay gateways between the first and last Voice band Data relay gateways in the communication path, whereby the Voice band Data relay gateways between the first and last Voice band Data relay gateways do not encode and decode the Voice band Data.

4. A method as recited in claim 1, further comprising initiating a probing sequence to detect the presence of Voice band Data.

5. A method as recited in claim 1, wherein the communication network includes a calling terminal and an answerer terminal, and the method provides that a probing sequence is initiated by the calling terminal to detect the presence of a Voice band Data relay.

6. A method as recited in claim 5, further comprising initiating the probing sequence via Non-standard facilities using the calling terminal.

7. A method as recited in claim 1, wherein the telecommunication network is configured to provide communication in a pre-determined protocol, and the protocol includes a non-standard information field following standard fields in each Call Menu signal and Joint Menu signal sequence to define information beyond what is defined in the protocol, said method further comprising having a gateway receive a Call Menu signal which contains standard fields, and transmit a Joint Menu signal with information relating to the presence and capability of the Joint Menu signal contained in the non-standard information field.

8. A method as recited in claim 7, wherein the protocol is V.8.

9. A method as recited in claim 1, further comprising modulating an answer tone with a signature pattern at a pre-determined frequency.

10. A method as recited in claim 9, further comprising modulating the answer tone such that the modulation is minimally intrusive to network echo cancellers, which use the answering tone as a means to get disabled, when the tone is detected in either direction in the communication path.

11. A method as recited in claim 10, wherein the communication network includes a calling terminal and an answerer terminal, further comprising providing that the gateway which detects the modulated answer tone actively mutes signals from the calling terminal toward the answerer terminal.

12. A method as recited in claim 11, further comprising providing that upon detection of the calling tone, a gateway sends a reply tone to a gateway transmitting the modulated tone.

13. A method as recited in claim 12, wherein the reply signal is a single tone at a pre-determined frequency for a pre-determined time interval.

14. A method as recited in claim 13, wherein the time interval does not exceed 100 ms.

15. A method as recited in claim 12, wherein the reply signal consists of the 1800 Hz tone in addition to another signal with lower amplitude.

16. A method as recited in claim 1, further comprising having the gateways achieve a common link rate during modem training.

17. A method as recited in claim 16, further comprising having a gateway retrain at a lower rate in order to achieve a common link rate along the communication path.

18. A method as recited in claim 1, further comprising padding the data to allow transmission into a higher speed link rate.

19. A method as recited in claim 1, further comprising scrambling demodulated data in one direction and descrambling the data in an opposite direction, in order to insure that network echo cancellers remain disabled.

20. A method as recited in claim 1, further comprising transmitting a fixed non-scrambled pattern along the communication path followed by a fixed length message containing a command.

* * * * *